United States Patent
Lunding et al.

(10) Patent No.: US 12,545,814 B2
(45) Date of Patent: Feb. 10, 2026

(54) PSA BONDING ELEMENT FOR CABLE WRAPPING

(71) Applicant: tesa SE, Norderstedt (DE)

(72) Inventors: Marta Lunding, Norderstedt (DE); Mathias Patrick Fink, Hamburg (DE)

(73) Assignee: TESA SE, Norderstedt (DE)

( * ) Notice: Subject to any disclaimer, the term of this patent is extended or adjusted under 35 U.S.C. 154(b) by 107 days.

(21) Appl. No.: 18/545,227

(22) Filed: Dec. 19, 2023

(65) Prior Publication Data

US 2024/0209242 A1    Jun. 27, 2024

(30) Foreign Application Priority Data

Dec. 21, 2022    (DE) .................. 102022134352.9

(51) Int. Cl.
  *C09J 7/38*   (2018.01)
  *C09J 7/21*   (2018.01)
  *C09J 109/00* (2006.01)

(52) U.S. Cl.
  CPC ............... *C09J 7/383* (2018.01); *C09J 7/21* (2018.01); *C09J 109/00* (2013.01); *C09J 2203/302* (2013.01); *C09J 2301/302* (2020.08); *C09J 2301/312* (2020.08); *C09J 2301/50* (2020.08)

(58) Field of Classification Search
  CPC ... C09J 7/383; C09J 7/21; C09J 109/00; C09J 2203/302; C09J 2301/302; C09J 2301/312; C09J 2301/50; C09J 2400/263; C09J 2407/00; C09J 2409/00; C09J 2453/00; C09J 7/38; C09J 7/387; C09J 11/04; C09J 145/00; C09J 153/02; C09J 2301/122; C08K 2003/265; C08K 3/26; C08L 45/00; C08L 7/00; C08L 53/02
  See application file for complete search history.

(56) References Cited

U.S. PATENT DOCUMENTS

| | | |
|---|---|---|
| 6,284,328 B1 | 9/2001 | Leydecker et al. |
| 6,936,553 B2 | 8/2005 | Von Samson-Himmelstjerna |
| 7,282,250 B2 | 10/2007 | Musahl et al. |
| 9,252,583 B2 | 2/2016 | Wahlers-Schmidlin et al. |
| 2003/0198806 A1 | 10/2003 | Samson-Himmelstjerna et al. |
| 2004/0082243 A1 | 4/2004 | Kuelper |
| 2013/0269861 A1 | 10/2013 | Kopf et al. |
| 2020/0056070 A1* | 2/2020 | Kutter ................. C09J 7/38 |
| 2020/0199410 A1 | 6/2020 | Leermann |
| 2021/0179899 A1 | 6/2021 | Ardente et al. |
| 2022/0177741 A1 | 6/2022 | Sawamura et al. |

FOREIGN PATENT DOCUMENTS

| | | |
|---|---|---|
| DE | 102 29 527 A1 | 1/2004 |
| DE | 103 29 994 A1 | 1/2005 |
| DE | 10 2007 031 224 A1 | 1/2009 |
| DE | 10 2008 021 739 A1 | 11/2009 |
| DE | 10 2016 202 353 A1 | 8/2017 |
| DE | 10 2018 207 149 A1 | 11/2019 |
| EP | 0 994 169 A2 | 4/2000 |
| EP | 1 270 695 A2 | 1/2003 |
| EP | 1 300 452 A2 | 4/2003 |
| EP | 1 367 608 A2 | 12/2003 |
| EP | 1 315 781 B1 | 1/2005 |
| EP | 1 312 097 B1 | 11/2006 |
| EP | 3 245 265 B1 | 7/2020 |
| EP | 3936328 A1 | 1/2022 |
| WO | 02/11155 A1 | 2/2002 |
| WO | 02/14446 A1 | 2/2002 |
| WO | 02/18509 A1 | 3/2002 |
| WO | 2006/108871 A1 | 10/2006 |
| WO | 2016/113132 A1 | 7/2016 |

* cited by examiner

*Primary Examiner* — Cynthia L Schaller
(74) *Attorney, Agent, or Firm* — Norris McLaughlin, PA

(57) ABSTRACT

A pressure-sensitive adhesive bonding element for use in wrapping plastic-insulated cables, comprising: a) a support layer, the support layer comprising a sheetlike fabric selected from the group consisting of velours, laid scrims, wovens and nonwovens, the sheetlike fabric comprising one or more synthetic fibres, b) an adhesive layer disposed on the support layer, the adhesive layer comprising a pressure-sensitive adhesive, the pressure-sensitive adhesive, based on the mass thereof, comprising: i) one or more diene rubbers in a combined mass fraction of 40% or more, and ii) one or more tackifier resins in a combined mass fraction of 25% or more, wherein the tackifier resins in the pressure-sensitive adhesive comprises one or more terpene-phenol resins having a hydroxyl number of 80 mg KOH/g or less, the combined mass fraction of the terpene-phenol resins being 25% or more, based on the total mass of the tackifier resins in the pressure-sensitive adhesive.

11 Claims, No Drawings

PSA BONDING ELEMENT FOR CABLE WRAPPING

PRIORITY CLAIMS

The present application claims priority of German Patent Application No. DE 10 2022 134 352.9, filed Dec. 21, 2022, the entire contents of which are hereby incorporated herein by reference.

DESCRIPTION

The invention relates to a pressure-sensitive adhesive bonding element for cable wrapping and to a corresponding method for wrapping cables using such a bonding element. Further disclosed are the use of corresponding bonding elements in the wrapping of plastic-insulated cables and the use of specific terpene-phenol resins as tackifier resin in a pressure-sensitive adhesive (PSA) for boosting the cable compatibility of the PSA.

The joining of separate entities is one of the central methods in manufacturing. In addition to other techniques, such as welding and soldering, for example, a prominent significance is nowadays enjoyed in particular by adhesive bonding, i.e joining using an adhesive. An alternative here to the use of shapeless adhesives, applied for example from a tube, are the so-called adhesive tapes, their bonding effect deriving from the adhesives employed. The use of adhesive tapes is accompanied by many advantages that make this technology a shoo-in for deployment across many branches of industry, examples being the electronics and vehicle industries.

There are numerous applications where, in particular, tapes known as pressure-sensitive adhesive tapes are relevant, where the bonding effect is provided by a PSA, which is durably tacky and also adhesive under typical ambient conditions. Such pressure-sensitive adhesive tapes can be applied by pressure to a substrate and remain adhering there, but later on can be removed again more or less without residue.

Adhesive tapes in general and pressure-sensitive adhesive tapes in particular are especially important in connection with the management of electrical cables. In many sectors of industry, for example in the vehicle industry sector, there are electrical cables to be bundled, routed and/or secured. Here, pressure-sensitive adhesive tapes afford an effective means of securing electrical cables or, through wrapping, of amalgamating a number of cables into larger cable looms. Accordingly, pressure-sensitive adhesive tapes are regularly viewed as being of particular advantage for use in connection with the management of electrical cables.

Despite the advantages of typical pressure-sensitive adhesive tapes in use in the management of electrical cables, in practice there are also problems confronting the skilled person. Electrical cables are generally provided with an electrically insulating protective layer of plastic, which shields the current-carrying conductors from the world outside and which is vital to the safe operation of electrical cables. The bonding layer of typical pressure-sensitive adhesive tapes usually comprises a complex mix of different substances—in particular, film-forming polymers and tackifier resins, and also plasticizers and other additives. When the plastic insulation on electrical cables is wrapped with a pressure-sensitive adhesive tape, the plastic insulation comes into contact with this adhesive. Over time, and particularly at elevated service temperatures, there may be physical and/or chemical interaction between the constituents of the adhesive and the plastic insulation. Such interactions may lead to the structural integrity of the plastic insulation diminishing with time, so increasing the threat of damage that may lead, for example, to the electrical conductor becoming exposed; as a result, there may in particular be safety risks that arise, as well as the threat of a short-circuit.

The extent to which a pressure-sensitive adhesive tape inflicts harm on a bonded plastic insulation with time is also referred to in the art as cable compatibility. The cable compatibility of pressure-sensitive adhesive tapes is an important property of those tapes intended for use in the management of electrical leads, and plays an important part in particular in sectors where long product lifetimes are desired, as in the vehicle or construction industry, for example.

Within the industry, accordingly, there is continual interest in developing highly performing pressure-sensitive adhesive tapes which have an advantageous cable compatibility and which in a cable wrapping utility cause very little, if any, damage to the plastic insulation even after long periods in service.

A particular requirement here in practice is to ensure good cable compatibility with respect to polyvinyl chloride (PVC), since good cable compatibility on PVC-clad leads emerges as a particular challenge in many cases.

Recent years, however, have seen an advance in the importance of advantageous cable compatibility for other insulating materials as well. One of the factors responsible for this is that polyvinyl chloride (PVC), previously used often as an insulating material, is being replaced by the cable manufacturers in part with more sustainable and/or more eco-friendly alternatives, with polyester plastics in particular, as well as fluoropolymers, having gained in importance as insulating materials. On interaction with adhesives, however, such insulating materials may display different behaviour from polyvinyl chloride, with the consequence that existing solutions established for PVC do not necessarily display satisfactory cable compatibility for many new types of cable.

In the prior art, there are numerous disclosures which address pressure-sensitive adhesive tapes and their use in the sheathing of cables and cable harnesses; examples include WO 02/14446 A1, EP 0994169 A2, DE 102008021739 A1, DE 102007031224 A1 and EP 1270695 A2. In many cases here, the prior art uses relatively non-polar tackifier resins such as, for example, hydrogenated hydrocarbon resins or aromatic hydrocarbon resins in order to achieve advantageous cable compatibilities, as is disclosed for example in DE102007031224A1.

While in certain cases the use of hydrocarbon resins, with or without hydrogenation, can lead to acceptable cable compatibilities, there are other factors in the art that occasionally cast a shadow on this solution. Indeed, in the estimation of the inventors, these relatively non-polar resins cannot be used to obtain sufficient cable compatibilities for certain inherently desirable adhesive compositions, especially not when used with PVC insulation. Furthermore, the peel adhesion achievable with the solution known from the prior art is regarded in certain cases as being ripe for improvement. At least for some applications, moreover, the restriction to the use of non-polar resins, especially hydrocarbon resins, is perceived as a disadvantage, as it limits the room for manoeuvre of the skilled person when adjusting the physicochemical properties of the adhesive.

The primary object of the present invention was to eliminate or at least reduce the disadvantages of the prior art.

An object of the present invention in particular was to specify pressure-sensitive adhesive bonding elements for use in the wrapping of plastic-insulated cables that feature excellent cable compatibility and that are suitable especially for use with a broad range of cable insulations made of different insulating plastics, but especially with PVC.

An object of the present invention here was that the pressure-sensitive adhesive bonding elements to be specified ought to feature excellent technical adhesive properties, and especially an advantageous peel adhesion.

A further object of the present invention was that the pressure-sensitive adhesive bonding elements to be specified ought to enable the achievement of greater flexibility in the design of cable-compatible adhesive compositions and in particular to make it possible to avoid the use of hydrocarbon resins.

It was desirable accordingly that the pressure-sensitive adhesive bonding elements to be specified ought to be able to be produced as far as possible using those starting materials and production methods that are already in use in the art today.

A supplementary object of the present invention was to specify a method for wrapping plastic-insulated cables.

A secondary object of the present invention was to provide a use for the pressure-sensitive adhesive bonding elements to be specified, in the wrapping of plastic-insulated cables, and to specify a use of specific terpene-phenol resins in PSAs for boosting the cable compatibility.

The inventors of the present invention have now found that the objects described above can surprisingly be achieved if in pressure-sensitive adhesive bonding elements, a specific configuration of the support layer is combined with specially designed, rubber-based PSAs, and if in the PSAs used, terpene-phenol resins having a low hydroxyl number as defined in the claims are used as tackifier resins. With pressure-sensitive adhesive bonding elements configured accordingly, it is surprisingly possible to achieve excellent cable compatibilities and advantageous technical adhesive properties for a broad range of different cable insulations, but particularly including insulations of PVC. A particular surprise here was that such advantageous properties, particularly in terms of the cable compatibility, can be achieved in these systems by using relatively polar resins, so giving the skilled person a greater flexibility in designing cable-compatible adhesive compositions.

The objects stated above are therefore achieved by the subject matter of the invention as it is defined in the claims. Preferred configurations of the invention are evident from the dependent claims and from the observations hereinafter.

Embodiments identified below as being preferred are combined in particularly preferred embodiments with features of other embodiments identified as being preferred. Especially preferred, accordingly, are combinations of two or more of the embodiments identified below as being more preferred. Likewise preferred are embodiments in which a feature of one embodiment that is identified to some extent as being preferred is combined with one or more further features of other embodiments that are identified to some extent as being preferred. Features of preferred methods and uses are evident from the features of preferred pressure-sensitive adhesive bonding elements.

Where, below, both specific amounts and/or fractions and preferred configurations are disclosed for an element, for example for a mixture constituent such as the diene rubbers or the terpene-phenol resins, the disclosure extends in particular to the specific amounts and/or fractions of these elements with preferred configuration. Also disclosed is the possibility that, for the corresponding specific total amounts and/or total fractions of the elements, at least part of or some of the elements may have a preferred configuration, and, in particular, that within the specific total amounts or total fractions, elements with preferred configuration may be present in turn in the specific amounts and/or fractions.

The invention relates to a pressure-sensitive adhesive bonding element for use in the wrapping of plastic-insulated cables, comprising:

a) a support layer, the support layer comprising a sheetlike fabric selected from the group consisting of velours, laid scrims, wovens and nonwovens, the sheetlike fabric comprising one or more synthetic fibres, b) an adhesive layer disposed on the support layer, the adhesive layer comprising a pressure-sensitive adhesive, the pressure-sensitive adhesive, based on the mass thereof, comprising:

i) one or more diene rubbers in a combined mass fraction of 40% or more, and ii) one or more tackifier resins in a combined mass fraction of 25% or more, wherein the tackifier resins in the pressure-sensitive adhesive comprise one or more terpene-phenol resins having a hydroxyl number of 80 mg KOH/g or less, the combined mass fraction of the terpene-phenol resins being 25% or more, preferably 30% or more, based on the total mass of the tackifier resins in the pressure-sensitive adhesive.

The pressure-sensitive adhesive bonding elements of the invention are suitable for use in the wrapping of cables insulated with plastics.

In the context of the present invention, the expression "pressure-sensitive adhesive bonding elements" identifies articles commonly also referred to as self-adhesive articles. In agreement with the understanding of the skilled person, this expression "pressure-sensitive adhesive bonding elements" encompasses all thin, sheetlike structures, i.e. structures having a predominant extent in two dimensions, more particularly films, film portions and labels, but more preferably adhesive tapes of extended length and limited width; corresponding pressure-sensitive adhesive bonding elements may frequently be traded in the form of rolls, for example. Preferred accordingly is a pressure-sensitive adhesive bonding element of the invention where said element is an adhesive tape or an adhesive label.

The pressure-sensitive adhesive bonding elements of the invention have pressure-sensitive adhesion, this being achieved through the use of a pressure-sensitive adhesive (PSA). In agreement with the understanding of the skilled person, a PSA is an adhesive which possesses pressure-sensitive adhesive properties, i.e. which has the capacity, under just relatively weak applied pressure, to enter into a durable bond to a substrate. Corresponding pressure-sensitive adhesive tapes are typically redetachable from the substrate after use, substantially without residue, and in general already have a permanent inherent tack at room temperature, meaning that they have a certain viscosity and touch-stickiness such that they wet the surface of a substrate with just a small applied pressure. The pressure-sensitive adhesiveness of such a tape derives from the use of a PSA as adhesive. Without wishing to be tied to this theory, a frequent assumption is that a PSA may be regarded as a fluid of extremely high viscosity with an elastic component, which accordingly has characteristic viscoelastic properties that lead to the above-described durable inherent tack and pressure-sensitive adhesive bonding capacity. The assumption is that with such PSAs, mechanical deformation results both in processes of viscous flow and in the development of elastic restoring forces. The viscous flow involved serves for the acquisition of adhesion while the elastic restoring forces are necessary in particular for achieving cohesion. The relationships between the rheology and the pressure-sensitive adhesiveness are known in the art and described for example in Satas' "Handbook of Pressure Sensitive Adhesive Technology", Third Edition (1999), pages 153 to 203. The degree of elastic and viscous components are typically characterized using the storage modulus (G') and the loss modulus (G"), which may be determined via dynamic mechanical analysis (DMA), using a rheometer, for example. In the context of the present invention, an adhesive is understood to have pressure-sensitive adhesiveness and hence to be a PSA preferably when, at a temperature of 23° C. in the deformation frequency range from $10^0$ to $10^1$ rad/sec, G' and G" are each situated at least partly in the range from $10^3$ to $10^7$ Pa*s.

The pressure-sensitive adhesive bonding elements of the invention comprise a support layer and also at least one adhesive layer which is disposed on the support layer and which comprises the PSA. Although it is possible in theory for the bonding elements of the invention to be implemented as double-sided bonding elements, it is preferred, with a view to the desired application in cable wrapping, to implement the bonding elements as single-sided bonding elements. Preferred accordingly is a pressure-sensitive adhesive bonding element of the invention wherein the bonding element comprises precisely one adhesive layer disposed on the support layer.

Functioning as support layer in the pressure-sensitive adhesive tapes of the invention is a sheetlike fabric which is a velour, a laid scrim, a woven or a nonwoven. The inventors have been able to achieve excellent results in their experiments with such support layers, said layers being preferred in particular over the use of support layers with smooth surfaces, such as polymeric films, for example. The inventors consider the use of wovens and nonwovens in particular to be especially advantageous in this context. Without wishing to be tied to this theory, the inventors assume that it is the surface quality, with its usual particular structure, and the pores which are usually present, that contribute to advantageous technical adhesive properties and result in wrapped cable harnesses in which the durability of the bonded assembly is particularly advantageous. Furthermore, the sheetlike fabrics here also contribute to the advantageous properties of pressure-sensitive adhesive bonding elements of the invention, and in particular they ensure good conformity and low flexural stiffness, which is advantageous for the wrapping of cable harnesses. Wovens, velours and in part also nonwovens make a contribution here to abrasion prevention, with nonwovens and velours in particular also having an advantageous influence on the noise damping.

Especially preferred in this context is the use of a nonwoven as sheetlike fabric, since such nonwovens regularly possess mechanical properties which predestine them for use in support layers of bonding elements. Preference is given accordingly to a pressure-sensitive adhesive bonding element of the invention wherein the sheetlike fabric is selected from the group consisting of wovens and nonwovens, preferably selected from the group consisting of nonwovens.

Although multi-ply support layers are potentially conceivable, preference is given to a pressure-sensitive adhesive bonding element of the invention wherein the support layer consists of the sheetlike fabric.

The sheetlike fabric for use in the support layer in accordance with the invention comprises at least one kind of synthetic fibres. In the experiments by the inventors, this criterion proved to be important for achieving, in combination with the PSAs for use in the invention, advantageous technical adhesive properties and excellent durability of the assembly producible on wrapping of cables; advantages are achievable in the durability of these assemblies particularly by comparison with cotton-based support materials. The advantageous plastics compatibility of the PSAs for use in the invention, as manifested in the good cable compatibility, also has the advantageous effect, in the estimation of the inventors, that the use of synthetic fibre-based supports, especially those composed of polymeric fibres, is possible with particular efficiency and in that case a good assembly strength is achieved at the interface between adhesive and support, with long lifetimes as well, with the use of synthetic fibres for the wrapped cable assembly enabling durability advantages to be achieved relative to other fibres, cotton for example.

The inventors have found accordingly that at least in principle, mixed materials can also be used as sheetlike fabrics, comprising natural fibres, for example, as well as synthetic fibres. In the estimation of the inventors, however, it is particularly preferable for the sheetlike fabrics to be formed as extensively as possible of synthetic fibres. Preferred accordingly is a pressure-sensitive adhesive bonding element of the invention wherein the sheetlike fabric consists of the synthetic fibres in a mass fraction of 90% or more, preferably of 95% or more, more preferably of 98% or more, especially preferably substantially completely, based on the mass of the sheetlike fabric.

The inventors have succeeded accordingly in identifying particularly advantageous types of synthetic fibre. Indeed, preference is given to a pressure-sensitive adhesive bonding element of the invention wherein the one or more synthetic fibres are selected from the group consisting of glass fibres and polymeric fibres, preferably selected from the group consisting of polymeric fibres, more preferably selected from the group consisting of polyester fibres, especially polyethylene terephthalate, and polyolefin fibres, especially polypropylene fibres.

With a view to highly sustainable production and to a reduction in the demand for fossil resources, the inventors propose that it is advantageous if the synthetic fibres are produced at least partly, and preferably substantially completely, from recycled plastics, this being advantageously possible in the context of the present invention. Preferred in this respect is a pressure-sensitive adhesive bonding element of the invention wherein the one or more synthetic fibres are selected from the group consisting of at least partly, preferably substantially completely, recycled synthetic fibres.

One constituent of the pressure-sensitive adhesive tapes of the invention that is particularly critical to the cable compatibility is the PSA, which in subsequent use comes into contact with the plastic insulation of the cable and which also co-determines the assembly strength and durability at the interface with the support layer.

The above-defined constituents of the PSA are each employed, in agreement with the understanding of the skilled person, as "one or more". The term "one or more" here refers, in a manner customary in the sector, to the chemical nature of the compounds in question and not to their molar amount. For example, the PSA may comprise exclusively styrene-isoprene-styrene rubber as diene rubber, meaning that the PSA would comprise a multiplicity of the molecules in question.

In a manner customary in the sector, the mass fractions here are specified as combined mass fractions of the one or more components, a specification which expresses the fact that the mass fraction of the components embodied correspondingly in the PSA, taken together, meets the corresponding criteria; in the absence of indications otherwise, the mass of the PSA is the reference system in each case.

In analogy to an approach frequently selected in the field of art, any fillers contained in the PSA, i.e. non-soluble constituents present heterogeneously in the PSA, such as particulate fillers or fibres, for example, are not counted as part of the PSA in the context of the present in invention, as also defined further below. Functioning as a reference system for the mass of the PSA, correspondingly, are those constituents of the PSA which the skilled person occasionally identifies as the "base formulation" and which, as well as the diene rubbers and tackifier resins, also encompass further additives, plasticizers for example.

The PSA for use in the invention comprises diene rubbers and tackifier resins. Both diene rubbers and tackifier resins are in principle polymeric compounds (or occasionally, in the case of tackifier resins, oligomeric compounds as well) which in part also derive from compatible building blocks, examples being diene compounds. In practice, however, the skilled person has no problems in distinguishing diene rubbers from tackifier resins. These compounds not only are traded commercially as diene rubbers or tackifier resins and are clearly identified as such in the expert circles, but can also in practice be distinguished without problem by the skilled person on the basis of their properties. One typical criterion for distinguishing diene rubbers from tackifier resins is generally the weight-average molar mass, which differs considerably between these compounds. With regard to this weight-average molar mass, preference is given to a pressure-sensitive adhesive bonding element of the invention wherein the one or more diene rubbers have a weight-average molar mass $M_W$ of 60 000 g/mol or more, preferably of 90 000 g/mol or more, and/or wherein the one or more tackifier resins have a weight-average molar mass $M_W$ of 10 000 g/mol or less, preferably of 5000 g/mol or less, more preferably of 1000 g/mol or less.

The weight-average molar mass is determined here on 100 µl of sample having undergone clarifying filtration (sample concentration 4 g/l). The eluent used is tetrahydrofuran with 0.1 vol % of trifluoroacetic acid. The measurement is made at 25° C. The precolumn used is a PSS-SDV-type column, 5 µm, $10^3$ Å, 8.0 mm*50 mm (statements here and below in the following order: type, particle size, porosity, internal diameter*length; 1 Å=$10^{-10}$ m). Separation takes place using a combination of the columns of type PSS-SDV, 5 µm, $10^3$ Å and also $10^5$ Å and $10^6$ Å each of 8.0 mm*300 mm (columns from Polymer Standards Service; detection by means of Shodex RI71 differential refractometer). The flow rate is 1.0 ml per minute. Calibration is carried out using the commercially available ReadyCal-Kit Poly (styrene) high from PSS Polymer Standards Service GmbH, Mainz. The values are converted using the Mark-Houwink parameters K and alpha universally into polymethyl methacrylate (PMMA), and so the data are reported in PMMA mass equivalents.

It may be seen as an advantage of the pressure-sensitive adhesive bonding elements of the invention that in terms of the diene rubbers to be used, they are relatively flexible. At the same time, however, the inventors have succeeded in identifying particularly suitable diene rubbers, with the use of synthetic rubbers being particularly preferred in particular in the estimation of the inventors. Preferred accordingly is a pressure-sensitive adhesive bonding element of the invention wherein the one or more diene rubbers are selected from the group consisting of natural rubber and synthetic rubbers, preferably selected from the group consisting of synthetic rubbers, more preferably selected from the group consisting of styrene-containing block copolymers, especially preferably styrene-isoprene-styrene block copolymer (SIS).

On the basis of comprehensive in-house experiments, moreover, the inventors succeeded in identifying particularly suitable ranges for the mass fraction of the diene rubbers in the PSA a; according to the estimation of the inventors, mass fractions in the vicinity of 50%, in particular, result in particularly advantageous pressure-sensitive adhesive bonding elements. Indeed, preference is given in particular to a pressure-sensitive adhesive bonding element of the invention wherein the combined mass fraction of the one or more diene rubbers is 40% or more, preferably 45% or more, more preferably 50% or more, based on the mass of the PSA. Preference is given, additionally or alternatively, to a pressure-sensitive adhesive bonding element of the invention wherein the combined mass fraction of the one or more diene rubbers is 60% or less, preferably 55% or less, based on the mass of the PSA. Particular preference is given to a pressure-sensitive adhesive bonding element of the invention wherein the combined mass fraction of the one or more diene rubbers is in the range from 30% to 60%, preferably in the range from 35% to 55%, more preferably in the range from 40% to 50%, based on the mass of the PSA.

Besides the diene rubbers, the PSA for use in the invention also comprises at least one tackifier resin. Preferred in this context is a pressure-sensitive adhesive bonding element of the invention wherein the combined mass fraction of the one or more tackifier resins is in the range from 25% to 70%, preferably in the range from 30% to 65%, more preferably in the range from 35% to 60%, based on the mass of the PSA. Preferred accordingly, additionally or alternatively, is a pressure-sensitive adhesive bonding element of the invention wherein the quotient of the combined mass of the one or more diene rubbers divided by the combined mass of the one or more tackifier resins is in the range from 0.7 to 1.5, preferably in the range from 0.8 to 1.4, more preferably in the range from 0.8 to 1.2.

It is essential for the pressure-sensitive adhesive bonding elements of the invention, in turn, that based on the total amount mass of the tackifier resins used, at least 25% or more, preferably 30%, of these tackifier resins are implemented as specific terpene-phenol resins. In the adhesives field, the skilled person is aware of terpene-phenol resins on the basis of his or her common general knowledge and these resins are available commercially from various suppliers, as for example from DRT under the trade name Dertophene. As the name also suggests, they are copolymers based on terpenes and phenol.

As observed further later on, in the combination of various further resins with the terpene-phenol resins for use in the invention, it is also possible to obtain advantageous pressure-sensitive adhesive bonding elements of the invention which in terms of their physicochemical properties in particular can be particularly closely tailored to the respective application requirements. In the estimation of the inventors, however, for the great majority of the embodiments it is preferred if the specific terpene-phenol resins are employed as extensively as possible as the tackifier resins. Preferred accordingly is a pressure-sensitive adhesive bonding element of the invention wherein the combined mass fraction of the one or more terpene-phenol resins is 50% or more, preferably 70% or more, more preferably 90% or more, very preferably substantially 100%, based on the total mass of the tackifier resins in the PSA.

In the light of the above observations concerning the preferred levels of tackifier resin and the advantage of extensive use of the specific terpene-phenol resins, the inventors, correspondingly, also consider particular mass fractions for the terpene-phenol resins to be preferred, these fractions arising from the fundamental mass fractions of the tackifier resins. Preferred accordingly is a pressure-sensitive adhesive bonding element of the invention wherein the combined mass fraction of the one or more terpene-phenol resins is 25% or more, preferably 30% or more, more preferably 35% or more, based on the mass of the PSA. Additionally or alternatively, preference is also given to a pressure-sensitive adhesive bonding element of the invention wherein the combined mass fraction of the one or more terpene-phenol resins is 70% or less, preferably 65% or less, more preferably 60% or less, based on the mass of the PSA. Particularly preferred, consequently, is a pressure-sensitive adhesive bonding element of the invention wherein the combined mass fraction of the one or more terpene-phenol resins is in the range from 25% to 70%, preferably in the range from 30% to 65%, more preferably in the range from 35% to 60%, based on the mass of the PSA.

The specific terpene-phenol resins have a low hydroxyl number, which in the estimation of the inventors is essential for achieving the advantageous effects. The hydroxyl number, occasionally also referred to for short as OH number, is a figure for the amount of hydroxyl groups present in a material, and is entirely familiar to the person skilled in the field of art, and is employed regularly particularly for the characterization of resins. The unit for the hydroxyl number is mg KOH/g, i.e. the hydroxyl number has the unit of milligrams of potassium hydroxide per gram of substance. In line with the customary approach in practice, the hydroxyl number in the context of the present invention is determined in accordance with DIN 53240-3:2016-03.

In the estimation of the inventors, it tends to be advantageous to use terpene-phenol resins with hydroxyl number is as low as possible. At the same time, in the estimation of the inventors, the level of hydroxyl groups in the tackifier resin also should not be chosen too low, in order to obtain particularly advantageous PSAs; accordingly, in the estimation of the inventors, a particularly advantageous concentration interval is obtained at around 50 mg KOH/g. Preferred initially is a pressure-sensitive adhesive bonding element of the invention wherein the one or more terpene-phenol resins have a hydroxyl number of 70 mg KOH/g or less, preferably 60 mg KOH/g or less, more preferably 50 mg KOH/g or less. Also preferred, additionally or alternatively, is a pressure-sensitive adhesive bonding element of the invention wherein the one or more terpene-phenol resins have a hydroxyl number of 15 mg KOH/g or more, preferably 20 mg KOH/g or more. Particularly preferred against this background is a pressure-sensitive adhesive bonding element of the invention wherein the one or more terpene-phenol resins have a hydroxyl number in the range from 15 to 80 mg KOH/g, preferably in the range from 20 to 70 mg KOH/g.

In the estimation of the inventors, it is preferable if the terpene-phenol resins used are as far as possible acid-free. Preferred correspondingly is a pressure-sensitive adhesive bonding element of the invention wherein the one or more terpene-phenol resins, preferably all the tackifier resins in the PSA, have a hydroxyl number according to DIN EN 1241:1998-05 of 5 mg KOH/g or less, preferably 2 mg KOH/g or less, more preferably 1 mg KOH/g or less.

Based on the experiments conducted by the inventors, they have succeeded in characterising particularly suitable terpene-phenol resins by way of the softening temperature. Preference is in fact given to a pressure-sensitive adhesive bonding element of the invention wherein the one or more terpene-phenols resins have a softening temperature as determined to ASTM E 28-18 (ring and ball) of 80° C. or more, preferably of 90° C. or more, with softening temperatures of 100° C. or more, for example, also being suitable.

As explained above, for the great majority of the embodiments of pressure-sensitive adhesive bonding elements of the invention, the inventors consider it advantageous if the tackifier resin they comprise is made up as extensively as possible, and preferably substantially exclusively, of the specific terpene-phenol resins. Permitted at the same time, it is also possible advantageously to combine the specific terpene-phenol resins with other tackifier resins and yet to achieve advantageous cable compatibilities. This extends the spectrum of the available adhesive compositions and improves the possibilities for adapting the physicochemical properties to the particular application requirements. Preference is therefore given to a pressure-sensitive adhesive bonding element of the invention wherein the PSA, in addition to the terpene-phenol resins, comprises one or more further tackifier resins, preferably in a combined mass fraction in the range from 1% to 70%, preferably in the range from 2% to 50%, more preferably in the range from 5% to 30%, based on the total mass of the tackifier resins in the PSA. Preference is given here to a pressure-sensitive adhesive bonding element of the invention wherein the one or more further tackifier resins are selected from the group consisting of hydrocarbon resins, preferably at least partly hydrogenated hydrocarbon resins. Additionally or alternatively, preference is given to a pressure-sensitive adhesive bonding element of the invention wherein the one or more further tackifier resins have a softening temperature as determined to ASTM E 28-18 of 80° C. or more, preferably of 90° C. or more.

The inventors have recognized that in the combination of the specific terpene-phenol resins with other tackifier resins, especially non-polar tackifier resins, such as hydrocarbon resins, it is particularly advantageous to harmonize the softening temperatures of the combined resins with one another. In this context, the inventors see particular advantage to those configurations more particularly in which one of the resins, i.e. the terpene-phenol resin or the further tackifier resin, has a high softening temperature, and its counterpart a comparatively low softening temperature. Preferred accordingly is a pressure-sensitive adhesive bonding element of the invention wherein the one or more terpene-phenol resins have a softening temperature of 120° C. or more and wherein the one or more further tackifier resins have a softening temperature in the range from 80 to 110° C., or wherein the one or more terpene-phenol resins or the one or more further tackifier resins have a softening temperature in the range from 80 to 110° C., and wherein the one or more further tackifier resins have a softening temperature in the range of 120° C. or more.

The corresponding combination of resins having different softening temperatures proves also to be advantageous for the combination of the terpene-phenol resins for use in the invention. Preferred, correspondingly, is a pressure-sensitive adhesive bonding element of the invention wherein at least one of the terpene-phenol resins with a hydroxyl number of 80 mg KOH/g or less, preferably 70 mg KOH/g or less, has a softening temperature of 120° C. or more and wherein at least one of the terpene-phenol resins with a hydroxyl number of 80 mg KOH/g or less, preferably 70 mg KOH/g or less, has a softening temperature in the range from 80 to 110° C.

In one particular variant of the above-disclosed combination of tackifier resins, the specific terpene-phenol resins which must be used in the PSAs of pressure-sensitive adhesive bonding elements of the invention are combined with other terpene-phenol resins which, rather than meeting the hydroxyl number criterion, instead have a higher hydroxyl number. Corresponding terpene-phenol resins with high hydroxyl number, taken per se, are usually not suitable, in the estimation of the inventors, for realizing good cable compatibilities and sufficient technical adhesive properties. In combination with the specific terpene-phenol resins, however, it is possible to use at least small amounts of such terpene-phenol resins having high hydroxyl numbers, so making it possible to further boost the flexibility in adjusting the physicochemical properties of the PSAs in an advantageous way, without losing the desired advantageous cable compatibility. Preferred correspondingly is also a pressure-sensitive adhesive bonding element of the invention wherein the PSA, further to the terpene-phenol resins, comprises one or more further terpene-phenol resins having a hydroxyl number of more than 80 mg KOH/g, more particularly more than 90 mg KOH/g, more particularly still more than 100 mg KOH/g, with the combined mass fraction of the further terpene-phenol resins being 25% or less, preferably 15% or less, more preferably 5% or less, based on the mass of the PSA.

It may be seen as an advantage of the PSAs that in terms of the presence of further typical PSA components they are highly flexible, so making it possible advantageously for the physical chemical properties to be tailored particularly closely to the respective requirements of the particular applications. In an illustrative pressure-sensitive adhesive bonding element of the invention, the PSA comprises one or more plasticizers, preferably in a combined mass fraction of 10% or less, more preferably of 5% or less, based on the mass of the PSA. In an additional or alternative illustrative pressure-sensitive adhesive bonding element of the invention, the PSA comprises one or more additives, preferably in a combined mass fraction in the range from 0.1% to 10%, more preferably in the range from 0.2% to 5%, the additives being preferably selected from the group consisting of ageing inhibitors, UV stabilizers, dyes, process assistants, based on the mass of the PSA.

A particular instance of the further components serving to adjust the properties of PSA's are insoluble fillers, which may be added to the PSA to give a filled PSA. These fillers comprise, for example, particulate fillers having a mean particle diameter (D50) of 5 μm or more, preferably 10 μm or more, more preferably 20 μm or more, which are insoluble in the PSA and correspondingly are present as a dispersion therein, or macroscopic fillers such as fibres, for example. The insoluble fillers are preferably selected from the group consisting of particulate fillers. The insoluble fillers are selected more preferably from the group consisting of expandable hollow polymer spheres, non-expandable hollow polymer spheres, solid polymer spheres, hollow glass spheres, solid glass spheres, hollow ceramic spheres, solid ceramic spheres, solid plastic spheres and inorganic compounds in powder form, examples being minerals such as chalk, i.e. calcium carbonate. Other suitable insoluble fillers nevertheless include, for example, fibres, laid scrims, platelets and rockets of materials which are insoluble in the PSA. In the context of the present invention, these insoluble fillers are not counted as part of the PSA, and accordingly are disregarded when calculating mass fractions relative to the mass of the PSA. In the context of the present invention, the definition instead is that the addition of insoluble fillers to a PSA results in a filled PSA. In this instance, therefore, the pressure-sensitive adhesive bonding element of the invention is one wherein the adhesive layer comprises a filled pressure-sensitive adhesive consisting of:

bb.1) the pressure-sensitive adhesive, and
bb.2) one or more insoluble fillers, for example chalk, with the combined mass fraction of the insoluble fillers being preferably in the range from 0.5% to 60%, more preferably in the range from 1% to 50%, very preferably in the range from 5% to 40%, based on the mass of the filled PSA.

In terms of the dimensions of the layers, in a preferred pressure-sensitive adhesive bonding element of the invention the support layer has a mean thickness in the range from 50 to 3000 μm, preferably in the range from 100 to 1000 μm, and/or the adhesive layer has a mean thickness in the range from 20 to 300 μm, preferably in the range from 30 to 150 μm.

Additionally or alternatively, preference is given to a pressure-sensitive adhesive bonding element of the invention wherein the support layer has a surface weight in the range from 30 to 400 g/m$^2$, preferably in the range from 50 to 200 g/m$^2$, and/or wherein the adhesive layer has a surface weight in the range from 20 to 300 g/m$^2$, preferably in the range from 30 to 150 g/m$^2$.

The invention also relates to methods for wrapping cables, comprising the method steps of:

x) producing or providing a pressure-sensitive adhesive bonding element of the invention,
y) producing or providing a plastic-insulated cable, and
z) wrapping the insulated cable with the bonding element to give a wrapped cable assembly.

Preferred here is a method of the invention wherein the plastic of the plastic-insulated cable is selected from the group consisting of polyolefins and polyesters, preferably polyesters. Additionally or alternatively, preference is given here to a method of the invention wherein the plastic of the plastic-insulated cable is selected from the group consisting of polyvinyl chloride (PVC), polypropylene (PP), cross-linked polyethylene (X-PE) and ethylene-tetrafluoroethylene copolymer (ETFE), more preferably selected from the group consisting of polypropylene (PP), cross-linked polyethylene (X-PE) and polyvinyl chloride (PVC), more preferably polyvinyl chloride (PVC).

Disclosed, furthermore, is the use of a bonding element of the invention in the wrapping of plastic-insulated cables for boosting the integrity of the wrapped cable assemblies by comparison with conventional wrapped cable assemblies. This means that through the use of the bonding elements of the invention, the resulting durability of an assembly wrapped with them is better than would be the case if using bonding elements known from the prior art.

Also disclosed, finally, is the use of one or more terpene-phenol resins having a hydroxyl number of 80 mg KOH/g or less as tackifier resin in a PSA for boosting the cable compatibility of the PSA, with the PSA, based on the mass of the PSA, comprising one or more diene rubbers in a combined mass fraction of 30% or more, and with the one or more terpene-phenolic resins being used in a combined mass fraction of 30% or more, based on the total mass of the tackifier resins in the PSA.

On the basis of the positive properties outlined, the pressure-sensitive adhesive bonding element can be used outstandingly for the insulating and wrapping of wires or cables.

The bonding element is used preferably for the jacketing of elongated items such as, in particular, cable harnesses, with the bonding element being passed in a helical movement around the elongated item. The resulting form is that of a helix (also called screw, screw line, cylindrical spiral or coil; a helix is a curve which winds at constant pitch around the surface of a cylinder).

In one variant, the elongated item is enveloped in the axial direction by the bonding element. The wrapping of a cable loom with the bonding element described takes place here not—in the usual way—in a helical line, but instead such that, during wrapping, a longitudinal axis of the bonding element is aligned substantially parallel to the running direction of the cable loom. As viewed in cross-section, the bonding element here lies in the form of an Archimedean spiral around the cable loom. This type of winding is also called "cable loom wrapping".

Likewise embraced by the inventive concept is a jacketed elongated item, such as in particular a cable harness, jacketed with a pressure-sensitive adhesive bonding element of the invention, and also a vehicle containing an elongated item jacketed in this way.

According to one embodiment of the invention, the elongated item is a wiring loom which comprises a bundle of multiple cables such as 3 to 1000 cables, preferably 10 to 500 cables, more particularly between 50 and 300 cables.

Because of the outstanding suitability of the pressure-sensitive adhesive bonding element, it can be used in a form of jacketing consisting of an envelope, in which the bonding element is present at least in an edge region of the envelope and is bonded on the envelope in such a way that the bonding element extends over one of the longitudinal edges of the envelope, preferably in an edge region which is narrow by comparison with the width of the envelope.

A product of this kind and also optimized embodiments thereof are disclosed in EP 1 312 097 A1. EP 1 300 452 A2, DE 102 29 527 A1 and WO 2006/108871 A1 set out onward developments for which the pressure-sensitive adhesive bonding element of the invention is likewise exceptionally suitable. The pressure-sensitive adhesive bonding element of the invention may also be used in a method as disclosed by EP 1 367 608 A2.

Lastly, EP 1 315 781 A1 and DE 103 29 994 A1 describe embodiments of adhesive tapes of a kind also possible for the pressure-sensitive adhesive bonding element of the invention.

In order to ensure correct application of the pressure-sensitive adhesive bonding element, particularly on cable looms, there may be at least one marker line running in longitudinal direction on the top side of the port. Preferably there are two marker lines. These marker lines differ visually and/or in tactile terms from the surface surrounding them.

The marking is applied on the support, by printing, for example. Alternatively or additionally, however, it is also possible for the marking to be incorporated into the first support. For instance, the marking may be realized as a warp thread incorporated by weaving, so to speak.

EP 3 245 265 A1 describes the use of such a marker line on an adhesive tape.

In order to enable particularly simple working for the user, there are perforations in the pressure-sensitive adhesive bonding element, which in particular are aligned at right angles to the running direction of the adhesive tape and/or are arranged at regular intervals.

This perforation serves primarily as a tear aid for separating off the mandated length.

Below, referring to experiments, the invention and preferred embodiments thereof are further explained and described.

A. Substances Used

The substances used in the experiments are listed in Table 1.

TABLE 1

| Substances used | | | |
|---|---|---|---|
| Abbreviation | Substance | Trade name | Manufacturer |
| Diene rubber 1 | SIS block copolymer Styrene content: 16% by wt. Diblock content: 25% by wt. | Europrene SOL T190 | Versalis |
| Diene rubber 2 | Natural rubber | STR (Standard Thai Rubber) | |
| Diene rubber 3 | SIS block copolymer Styrene content: 30% by wt. Diblock content: 20% by wt. | Kraton D1165 | Kraton Polymers |
| Tackifier resin 1 | Hydrogenated hydrocarbon resin | Regalite R1100 | Synthomer |
| Tackifier resin 2 | Hydrogenated hydrocarbon resin | Plastolyn R1140 | Synthomer |
| Tackifier resin 3 | Terpene-phenol resin T(softening): 95° C. OH number: 30 to 50 mg KOH/g | Dertophene T | DRT |
| Tackifier resin 4 | Terpene-phenol resin T(softening): 135° C. OH number: 50 mg KOH/g | Dertophene T135 | DRT |
| Tackifier resin 5 | Terpene-phenol resin T(softening): 118° C. OH number: 135 to 150 mg KOH/g | Dertophene H150 | DRT |
| Tackifier resin 6 | Rosin (Pentaerythritol ester of rosin) | Hydrogral P | DRT |
| Plasticizer | White oil | Pionier 2070P | Hansen und Rosenthal KG |
| Ageing inhibitor (AgIn) | Sterically hindered phenol | Irganox 1520L | BASF |
| Filler | Calcium carbonate | Kreide MS40 | Kreidewerke Dammann |

B. Production of the Pressure-Sensitive Adhesive Bonding Elements

To produce the pressure-sensitive adhesive bonding elements from the substances indicated in Table 1, first the PSAs were produced. For this, the respective substances used were placed in the corresponding proportion into a glass vessel. A solvent mixture of benzine and toluene was added, establishing a solids content of 20% or 40% by weight. The systems thus prepared were subsequently stored for at least 3 days on a roller bed, to combine or dissolve all of the substances uniformly. Subsequently, using a coating table, the coating compositions thus prepared were each applied in one instance to a 36 μm etched PET film (for peel adhesion measurement) and in another instance to a 36 μm PET transfer film (for cable compatibility tests), achieving a dried-state surface weight of 45 g/m² in each case. These specimens were subsequently dried in an oven at 120° C. for 15 minutes. The dried adhesives on the transfer liner were subsequently applied, using a laminating apparatus, to a respective fabric support of PET-Maliwatt nonwoven type with a surface weight of 72 g/m². The corresponding production of the adhesive layers from solution is especially suitable for rapid sample production on the laboratory scale, and so is employed in the context of the present invention.

An alternative possibility, however, is coating from the melt, for example; with this approach, according to the estimation of the inventors, the adhesive layers obtained are frequently layers which in fact display slightly improved properties relative to the solvent-based method, though this is not important for the present relative comparison. For such coating from the melt, i.e. in a so-called hotmelt operation, the substances used, in the corresponding proportion, for example, are metered into a twin-screw extruder or planetary roller extruder and are compounded at elevated temperature to form a uniform adhesive. The corresponding adhesive layer with the target surface weight can then be shaped, for example, on a coating facility with nozzle coating.

C. Samples Produced

The composition of the PSAs in the adhesive tapes produced is summarized in Tables 2, 3 and 4.

TABLE 2

Composition of the samples in mass fractions - Part I

| Substance | I1 | I2 | I3 | I4 | I5 | I6 | I7 |
|---|---|---|---|---|---|---|---|
| Diene rubber 1 | 49.8 | 49.8 | 49.8 | 34.8 | 19.9 | 49.8 | 49.8 |
| Diene rubber 2 | — | — | — | — | 29.9 | — | — |
| Tack. resin 1 | — | — | — | — | — | 24.9 | — |
| Tack. resin 2 | — | — | — | — | — | — | — |
| Tack. resin 3 | 49.7 | — | — | — | — | — | 36.2 |
| Tack. resin 4 | — | 46.2 | 49.7 | 34.7 | 49.7 | 24.8 | — |
| Tack. resin 5 | — | — | — | — | — | — | 10.0 |
| Tack. resin 6 | — | — | — | — | — | — | — |
| Plasticizer | — | 3.5 | — | — | — | — | 3.5 |
| AgIn | 0.5 | 0.5 | 0.5 | 0.5 | 0.5 | 0.5 | 0.5 |
| Filler | — | — | — | 30 | — | — | — |

TABLE 3

Compositions of the samples in mass fractions - Part II

| Substance | I8 | C1 | C2 | C3 | C4 | C5 | C6 |
|---|---|---|---|---|---|---|---|
| Diene rubber 1 | 34.8 | 49.8 | 49.8 | 49.8 | 49.8 | 49.8 | 49.8 |
| Diene rubber 2 | — | — | — | — | — | — | — |
| Tack. resin 1 | — | — | 46.2 | — | 23.1 | — | 24.9 |
| Tack. resin 2 | — | — | — | — | — | — | — |
| Tack. resin 3 | 7.0 | — | — | — | — | — | — |
| Tack. resin 4 | 27.7 | — | — | — | — | — | — |
| Tack. resin 5 | — | — | — | 46.2 | 23.1 | 49.7 | 24.8 |
| Tack. resin 6 | — | 49.7 | — | — | — | — | — |
| Plasticizer | — | — | 3.5 | 3.5 | 3.5 | — | — |
| AgIn | 0.5 | 0.5 | 0.5 | 0.5 | 0.5 | 0.5 | 0.5 |
| Filler | 30 | — | — | — | — | — | — |

TABLE 3

Composition of the samples in mass fractions - Part III

| Substanz | I9 | I10 | I11 | I12 | I13 |
|---|---|---|---|---|---|
| Diene rubber 1 | — | — | 17.8 | 20.0 | 21.8 |
| Diene rubber 2 | — | — | 26.7 | 30.0 | 32.7 |
| Diene rubber 3 | 56.5 | 60.0 | — | — | — |
| Tack. resin 1 | — | — | — | — | — |
| Tack. resin 2 | — | — | — | — | — |
| Tack. resin 3 | 8.7 | 8.0 | 11.1 | 10.0 | 9.1 |
| Tack. resin 4 | 34.8 | 32.0 | 44.4 | 40.0 | 36.4 |
| Tack. resin 5 | — | — | — | — | — |

TABLE 3-continued

Composition of the samples in mass fractions - Part III

| Substanz | I9 | I10 | I11 | I12 | I13 |
|---|---|---|---|---|---|
| Tack. resin 6 | — | — | — | — | — |
| Plasticizer | — | — | — | — | — |
| AgIn | — | — | — | — | — |
| Filler | — | — | — | — | — |

It may again be emphasized that the insoluble fillers listed in the table are not counted as part of the PSA in the context of the present invention and accordingly are disregarded when calculating mass fractions relative to the mass of the PSA.

D. Experiments Conducted:

The following tests were carried out on the samples produced as described above.

Peel Adhesion:

The peel adhesions were determined in analogy to AFERA 5001 at 23° C. and 50% relative humidity with a removal speed of 300 mm/min and a removal angle of 180°. Steel plates compliant with the standard were used as substrate. The measurement strip was bonded using a roller application machine at 4 kg and a temperature of 23° C. The adhesive tapes were removed immediately after application. The measured value (in N/cm) was obtained as a mean value from three individual measurements.

Cable Compatibility to VW 60360-3: 2019-05:

The test method used, VW 60360-3: 2019-05, is an established automotive testing guideline to evaluate the cable compatibility in a long-term test over 3000 h. The test method is based on LV 312, which is also comprehensively described in applications including, for example, DE 102007031224 A1. The basic principle is that in accordance with VW 60360-3: 2019-05, the respective adhesive tape is wound around cables having different insulations and is stored at mandated temperatures (e.g. 105° C. and 125° C.). Every 500 h, one of the wrapped cables is checked, the adhesive tape is an wound again, and the cable is wound around mandrels of 10 mm and 2 mm in diameter. The insulation is examined for any damage in this procedure. For the samples described above, the result of the test according to VW 60360-3: 2019-05 is shown below at a temperature of 105° C. on PVC insulations and also at 125° C. on PP, X-PE and ETFE insulations.

The cable insulated with PVC and examined is from Coficab (designation: FLRY-A).

The cable insulated with X-PE and examined is from Draka (designation: FLR21X-A hffr).

The cable insulated with PP and examined is from Coroplast (designation: 8-8099).

The cable insulated with ETFE and examined is from Gebauer & Griller (designation: ETFE A72).

The results are summarized in Table 4 below.

TABLE 4

Results of the experiments conducted

| | Peel | Cable compatibility acc. to VW 60360-3: 2019 May | | | |
|---|---|---|---|---|---|
| Sample | adhesion/ (N/cm) | PVC/ 105° C. | PP/ 125° C. | X-PE/ 125° C. | ETFE/ 125° C. |
| I1 | 9.8 | P | P | P | P |
| I2 | 10.5 | P | P | P | P |
| I3 | 10.2 | P | P | P | P |

TABLE 4-continued

Results of the experiments conducted

| Sample | Peel adhesion/ (N/cm) | PVC/ 105° C. | PP/ 125° C. | X-PE/ 125° C. | ETFE/ 125° C. |
|---|---|---|---|---|---|
| I4 | 7.0 | P | P | P | P |
| I5 | 10.0 | P | P | P | P |
| I6 | 10.2 | P | P | P | P |
| I7 | 3.4 | P | P | P | P |
| I8 | 14.3 | P | P | P | P |
| I9 | 4.0 | P | P | P | P |
| I10 | 6.8 | P | P | P | P |
| I11 | 9.7 | P | P | P | P |
| I12 | 7.0 | P | P | P | P |
| I13 | 5.2 | P | P | P | P |
| C1 | 8.7 | F | ND | ND | ND |
| C2 | 7.7 | F | F | P | P |
| C3 | NM | NM | NM | NM | NM |
| C4 | NM | NM | NM | NM | NM |
| C5 | NM | NM | NM | NM | NM |
| C6 | NM | NM | NM | NM | NM |

(P = pass; F = fail; NM = not measurable; ND = not measured)

The results summarised in Table 4 show that inventive pressure-sensitive adhesive bonding elements exhibit advantageous peel adhesions and excellent cable compatibilities. All inventive pressure-sensitive adhesive bonding elements pass the established test according to VW 60360-3: 2019-05.

The advantages linked to the use of the specific terpene-phenol resins are evident, for example, with particular clarity in a comparison of sample C2 with sample I2, where the replacement of a non-polar hydrogenated hydrocarbon resins as frequently used in the prior art by the specific terpene-phenol resins with low OH number surprisingly allows advantageous cable compatibilities to be achieved, with the peel adhesion being improved as well. This advantageous cable compatibility is manifested for a broad range of relevant insulation materials, but especially for PVC. A comparison of samples C1 with I1 and I3 as well illustrates the improvement in the cable compatibility in conjunction with a boost to the peel adhesion that can be achieved with inventive bonding elements.

Comparative samples C3 to C6 show no measurable peel adhesion and illustrate the advantage of the terpene-phenol resins for use in the invention in the systems of the present invention, including in particular in contradistinction to terpene-phenol resins with higher hydroxyl numbers.

Further to the experiments above, adhesives I1, I2, I4, I6, I9 and I11, in analogy to the procedure described above, were also applied to a woven support (surface weight 130 g/cm²) and rated for cable compatibility. All of the specimens thus produced passed the cable compatibility test on the types of cable stated in Table 4 at the corresponding test temperatures.

The invention claimed is:

1. A method for wrapping cables, comprising the method steps of:
    a) producing or providing a pressure-sensitive adhesive bonding element comprising:
        i) a support layer, the support layer comprising a sheetlike fabric selected from the group consisting of velours, laid scrims, wovens and nonwovens, the sheetlike fabric comprising one or more synthetic fibers,
        ii) an adhesive layer disposed on the support layer, the adhesive layer comprising a pressure-sensitive adhesive, the pressure-sensitive adhesive, based on the mass thereof, comprising:
            (1) one or more diene rubbers in a combined mass fraction of 40% or more, and
            (2) one or more tackifier resins in a combined mass fraction of 25% or more,
        wherein the tackifier resins in the pressure-sensitive adhesive comprise one or more terpene-phenol resins having a hydroxyl number of 80 mg KOH/g or less, the combined mass fraction of the terpene-phenol resins being 25% or more, based on the total mass of the tackifier resins in the pressure-sensitive adhesive,
    b) producing or providing a plastic-insulated cable, and
    c) wrapping the insulated cable with the bonding element to give a wrapped cable assembly.

2. Method according to claim 1, wherein the sheetlike fabric is selected from the group consisting of wovens and nonwovens.

3. Method according to claim 1, wherein the sheetlike fabric consists of the synthetic fibres in a mass fraction of 90% or more.

4. Method according to claim 1, wherein the combined mass fraction of the one or more diene rubbers is in the range from 40% to 60%, based on the mass of the pressure-sensitive adhesive.

5. Method according to claim 1, wherein the one or more diene rubbers are selected from the group consisting of synthetic rubbers.

6. Method according to claim 1, wherein the combined mass fraction of the one or more terpene-phenol resins is 30% or more, based on the mass of the pressure-sensitive adhesive.

7. Method according to claim 1, wherein the combined mass fraction of the one or more terpene-phenol resins is 50% or more, based on the mass of the pressure-sensitive adhesive.

8. Method according to claim 1, wherein the one or more terpene-phenol resins have a hydroxyl number of 70 mg KOH/g or less.

9. Method according to claim 1, wherein the one or more terpene-phenol resins have a softening temperature as determined to ASTM E 28-18 of 80° C. or more.

10. Method according to claim 1, wherein further to the terpene-phenol resins, the pressure-sensitive adhesive comprises one or more further terpene-phenol resins having a hydroxyl number of more than 80 mg KOH/g, the combined mass fraction of the further terpene-phenol resins being 25% or less, based on the mass of the pressure-sensitive adhesive.

11. A plastic-insulated cable wrapped with a bonding element and obtained according to the method according to claim 1.

* * * * *